United States Patent
Mori

(10) Patent No.: US 7,148,432 B2
(45) Date of Patent: Dec. 12, 2006

(54) WEIGHT-MEASURING SENSOR

(75) Inventor: Teruo Mori, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/547,547

(22) PCT Filed: Mar. 12, 2004

(86) PCT No.: PCT/JP2004/003375

§ 371 (c)(1),
(2), (4) Date: Sep. 1, 2005

(87) PCT Pub. No.: WO2004/088257

PCT Pub. Date: Oct. 14, 2004

(65) Prior Publication Data

US 2006/0157288 A1 Jul. 20, 2006

(30) Foreign Application Priority Data

Mar. 31, 2003 (JP) ............................. 2003-095184

(51) Int. Cl.
*G01L 1/12* (2006.01)
(52) U.S. Cl. .................. 177/210 EM; 73/862.331; 73/862.335; 73/862.626; 73/862.69
(58) Field of Classification Search ............ 177/210 R, 177/210 EM; 73/862.331, 862.335, 862.626, 73/862.69
See application file for complete search history.

(56) References Cited

U.S. PATENT DOCUMENTS

| | | | | |
|---|---|---|---|---|
| 3,731,984 A | * | 5/1973 | Habermann | ................ 310/90.5 |
| 4,955,241 A | * | 9/1990 | Schiessle et al. | ........ 73/862.69 |
| 5,587,617 A | * | 12/1996 | Dunfield et al. | ........... 310/90.5 |
| 5,619,083 A | * | 4/1997 | Dunfield et al. | ........... 310/90.5 |
| 5,905,210 A | * | 5/1999 | O'Boyle et al. | ....... 73/862.331 |
| 6,307,295 B1 | * | 10/2001 | Murabe et al. | ............ 310/90.5 |
| 6,345,544 B1 | * | 2/2002 | Mizuno et al. | .......... 73/862.69 |
| 6,617,722 B1 | * | 9/2003 | Ooyama et al. | .......... 310/68 B |
| 2003/0051563 A1 | * | 3/2003 | Jin et al. | |
| 2004/0211268 A1 | * | 10/2004 | Morelli et al. | |
| 2005/0274195 A1 | * | 12/2005 | Mizuno et al. | |
| 2006/0179959 A1 | * | 8/2006 | Ouyang et al. | |

FOREIGN PATENT DOCUMENTS

| | | |
|---|---|---|
| JP | A 7-5020 | 1/1995 |
| JP | A 2000-321153 | 11/2000 |

* cited by examiner

*Primary Examiner*—Randy W. Gibson
(74) *Attorney, Agent, or Firm*—Oliff & Berridge, PLC

(57) ABSTRACT

A weight sensor 10 having a simple structure and yet being capable of detecting load or pressure of an object to be measured in a short time and with high sensitivity and high precision. The sensor includes a first rotating shaft 14 vertically and rotatably supported on a stage 12, a second rotating shaft 18 axially and coaxially connected to the first rotating shaft 14 with a magnetostrictive member 16 interposed therebetween for rotatably supporting an object 20 to be measured, and a pickup coil 28 for detecting changes in magnetic permeability or remnant magnetization of the magnetostrictive member 16. Load or pressure of the object 20 is detected as the changes in magnetic permeability or remnant magnetization, which are caused by extension and contraction of the magnetostrictive member 16.

4 Claims, 5 Drawing Sheets

PRIOR ART

WEIGHT-MEASURING SENSOR

TECHNICAL FIELD

The present invention relates to a weight sensor that detects load or pressure of an object to be measured using a magnetostrictive member.

BACKGROUND ART

Conventionally, piezoelectric weight sensors, capacitance weight sensors, and the like for detecting load or pressure of an object to be measured are widely known (see, for example, Japanese Patent Laid-Open Publication No. Hei 7-5020).

One conventionally known weight sensor 1 shown in FIG. 6 is generally made up of a rotating shaft 5 vertically supported by a bearing 3 on a stage 2 and driven to rotate by a motor 4, and a scale plate 7 attached to an upper part of this rotating shaft 5.

The weight sensor 1 detects load of an object 6 placed on the scale plate 7 by a weight sensor unit 8 provided below the bearing 3.

With this known weight sensor 1, however, because the load of the object 6 is transmitted to the weight sensor unit 8 through the bearing 3, the sensor was easily affected by mechanical noises of the bearing 3, and high-precision measurement of the load of the object 6 was hard to achieve. When the object 6 is placed offset from the center of the scale plate 7, in particular, the sensor was easily affected by a load that is generated in a horizontal direction due to the sensor structure, resulting in a large measurement error.

DISCLOSURE OF THE INVENTION

The present invention was devised to solve these problems and its object is to provide a weight sensor which has a simple structure and yet is capable of detecting load or pressure of an object in a short time and with high sensitivity and high precision.

Through research, the inventors of the present invention have devised a weight sensor that can detect load or pressure of an object in a short time and with high sensitivity and high precision, in which a rotating shaft for supporting the object is separated into two, first and second, rotating shafts and a magnetostrictive member is provided between the two rotating shafts.

In summary, the above-described objectives are achieved by the following aspects of the present invention.

(1) A weight sensor characterized by comprising: a first rotating shaft vertically and rotatably supported on a stage; a second rotating shaft axially and coaxially connected to the first rotating shaft with a magnetostrictive member interposed therebetween for rotatably supporting an object to be measured; and detecting means for detecting changes in magnetic permeability or remnant magnetization of the magnetostrictive member, wherein load or pressure of the object is detected as changes in magnetic permeability or remnant magnetization, which are caused by extension and contraction of the magnetostrictive member.

(2) The weight sensor according to (1), wherein: the detecting means includes a pickup coil disposed to surround the magnetostrictive member without contacting the first and second rotating shafts; and the changes in magnetic permeability or remnant magnetization are detected as changes in inductance of the pickup coil.

(3) The weight sensor according to (1) or (2), wherein the first rotating shaft is rotatably supported by a pair of radial magnets disposed between the first rotating shaft and the stage such that their magnetic poles are opposite each other.

(4) The weight sensor according to any one of (1) to (3), wherein the first rotating shaft and the second rotating shaft are spline-coupled to each other.

(5) The weight sensor according to any one of (1) to (4), wherein the magnetostrictive member is a giant magnetostrictive member made of a giant magnetostrictive element.

BEST MODE FOR CARRYING OUT THE INVENTION

Exemplary embodiments of the present invention will be hereinafter described with reference to the drawings.

Figure 1:
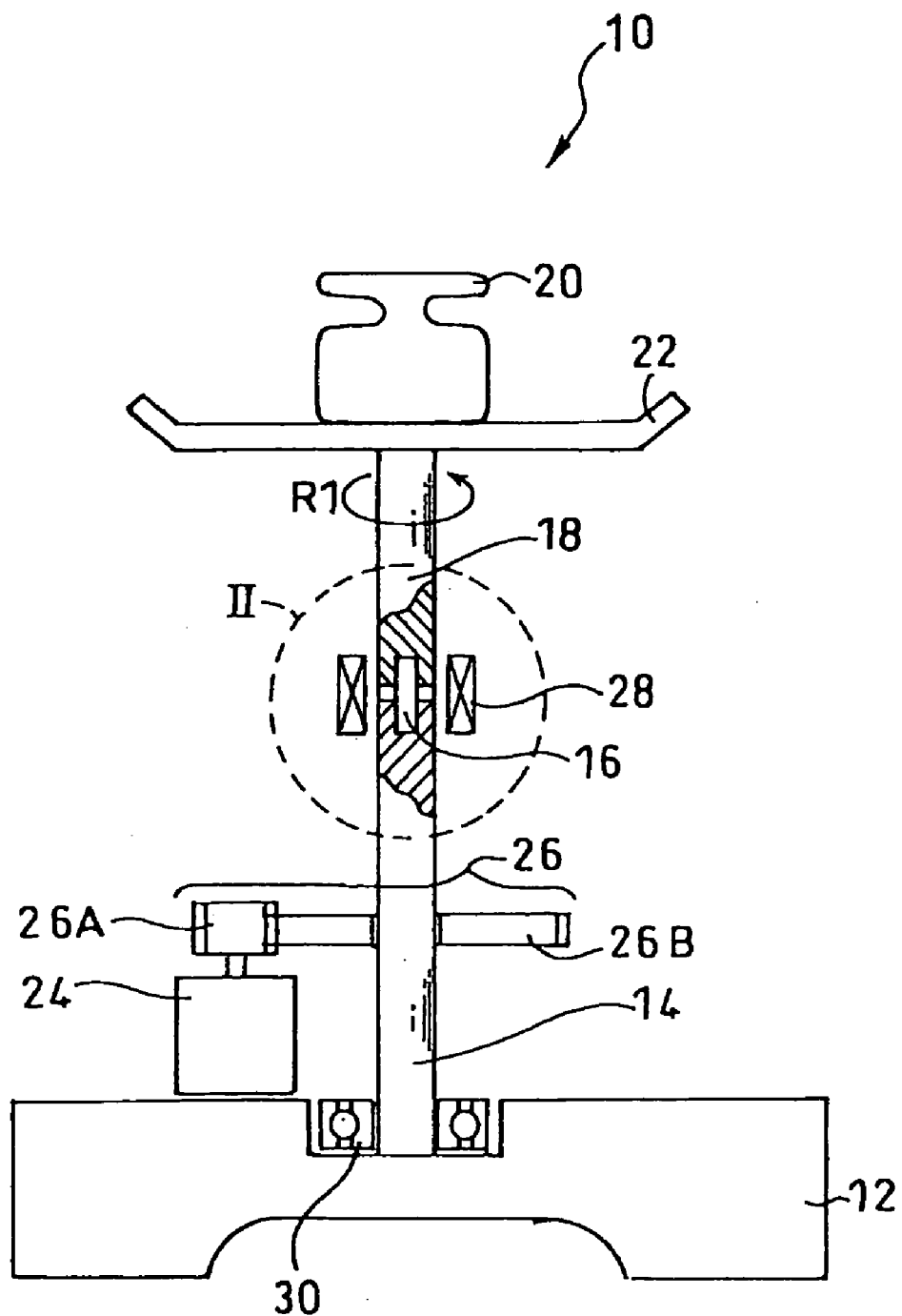
FIG. 1 is a schematic front view showing a weight sensor according to one exemplary embodiment of the present invention.
Figure 2:
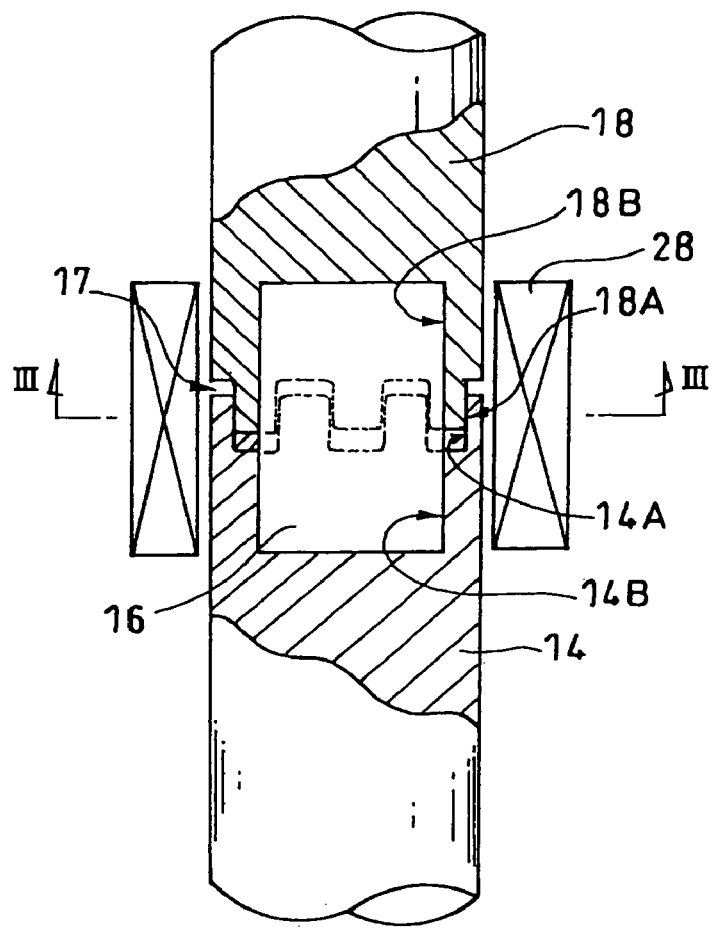
FIG. 2 is a partially cross-sectional front view showing, in enlargement, part II of FIG. 1 surrounding the giant magnetostrictive member.
Figure 3:
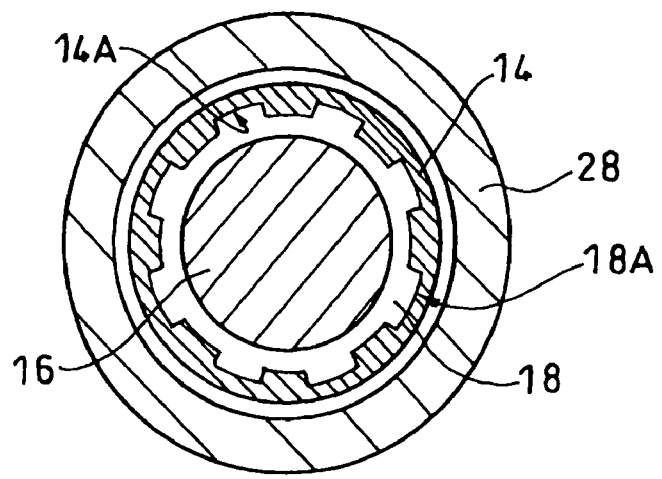
FIG. 3 is a cross-sectional view taken along the line III—III in FIG. 2.

As shown in FIG. 1 to FIG. 3, a weight sensor 10 according to one exemplary embodiment of the present invention is made up of a first rotating shaft 14 vertically disposed on a stage 12 located in the lower part of the drawing, a second rotating shaft 18 axially and coaxially connected to this first rotating shaft 14 with a giant magnetostrictive member 16 interposed therebetween, a scale plate 22 provided in an upper part of this second rotating shaft 18 for placing an object 20 to be measured thereon, a motor 24 and a reduction mechanism 26 for rotating this scale plate 22 through the first and second rotating shafts 14 and 18, and a pickup coil (detecting means) 28 arranged to surround the outer circumference of the giant magnetostrictive member 16 without contacting the first and second rotating shafts 14 and 18.

The first rotating shaft 14 vertically disposed on the stage 12 is rotatably supported at its lower end by a bearing 30 provided on the stage 12. A gear 26B of the reduction mechanism 26 is attached axially in the middle of the first rotating shaft 14. The gear 26B meshes with a pinion 26A attached to a motor shaft of the motor 24, so that the first rotating shaft 14 is driven by the motor 24 to rotate in a direction of R1 in the drawing.

As shown in enlargement in FIG. 2 and FIG. 3, the upper end of the first rotating shaft 14 has spline grooves 14A formed in a cylindrical inner surface. Correspondingly, the lower end of the second rotating shaft 18 is formed as a spline cylinder 18A that can fit with the spline grooves 14A formed in the first rotating shaft 14. A hollow part 14B inside the spline grooves 14A and a hollow part 18B inside the spline cylinder 18A are continuous with each other in the axial direction, and the giant magnetostrictive member 16 is accommodated in this space.

The first rotating shaft 14 and the second rotating shaft 18 are thus spline-coupled to each other so that the giant magnetostrictive member 16 is held from above and below, and an axial gap 17 is secured between the two shafts for allowing axial extension and contraction of the giant magnetostrictive member 16. Also, a predetermined gap is secured between the radial inner surface of the spline cylinder 18A of the second rotating shaft 18 and the radial outer surface of the giant magnetostrictive member 16 so as not to hinder radial extension and contraction of the giant magnetostrictive member 16.

The giant magnetostrictive member 16 disposed to be held between the first and second rotating shafts 14 and 18 is made of a giant magnetostrictive element. The "giant magnetostrictive element" shall refer to a magnetostrictive element made from powder sintered alloy or single-crystal alloy that is mainly composed of a rare-earth element and/or specified transition metal (for example, terbium, dysprosium, iron and the like), and this giant magnetostrictive element has a characteristic that its magnetic susceptibility changes largely when the element is deformed by an external stress. The pickup coil 28 can detect changes in the magnetic permeability or remnant magnetization of the giant magnetostrictive member 16 caused by such deformation (extension and contraction) as changes in the inductance of the pickup coil 28.

Next, the operation of the weight sensor 10 is described.

When a load or pressure is applied on the scale plate 22 of the weight sensor 10 by placing an object 20 to be measured thereon, the giant magnetostrictive member 16 disposed between the first and second rotating shafts 14 and 18 is subjected to an axial load. This load causes the giant magnetostrictive member 16 to extend in the radial direction and to contract in the axial direction. As a result, the volume of the giant magnetostrictive member 16 that occupies the inner space of the pickup coil 28 changes, and so does the magnetic permeability or remnant magnetization of the giant magnetostrictive member 16. Accordingly, the load or pressure of the object 20 can be detected by detecting these changes in the magnetic permeability or remnant magnetization as changes in the inductance of the pickup coil 28.

With the weight sensor 10 according to the exemplary embodiment of the present invention, the load or pressure of the object 20 is exerted on the giant magnetostrictive member 16 without a bearing or the like therebetween that can cause a measurement error, and therefore even a slight change in the load or pressure can be detected, which was conventionally difficult, and the load or pressure of the object 20 is detected with high sensitivity and high precision. Moreover, with the use of the giant magnetostrictive member 16 made of a giant magnetostrictive element which responds quickly to external stress, the load or pressure is detected in a short time.

Further, because the weight sensor 10 includes the pickup coil (detecting means) 28 disposed such that it does not make contact with the first and second rotating shafts 14 and 18, the detecting means cannot be the cause of a measurement error, and high-precision measurement is possible. While the changes in the magnetic permeability or remnant magnetization of the giant magnetostrictive member 16 are detected as inductance changes of the pickup coil 28 in the above-described exemplary embodiment, the present invention is not limited thereto, and any other detecting means may be employed, as long as it can detect changes in the magnetic permeability or remnant magnetization of the giant magnetostrictive member.

The structure, shape and the like of the weight sensor of the present invention should not be limited to the weight sensor 10 according to the above-described exemplary embodiment. The minimum requirements are a first rotating shaft vertically and rotatably supported on a stage, a second rotating shaft axially and coaxially connected to the first rotating shaft with a magnetostrictive member interposed therebetween for rotatably supporting an object to be measured, and detecting means for detecting changes in magnetic permeability or remnant magnetization of the magnetostrictive member.

Figure 4:
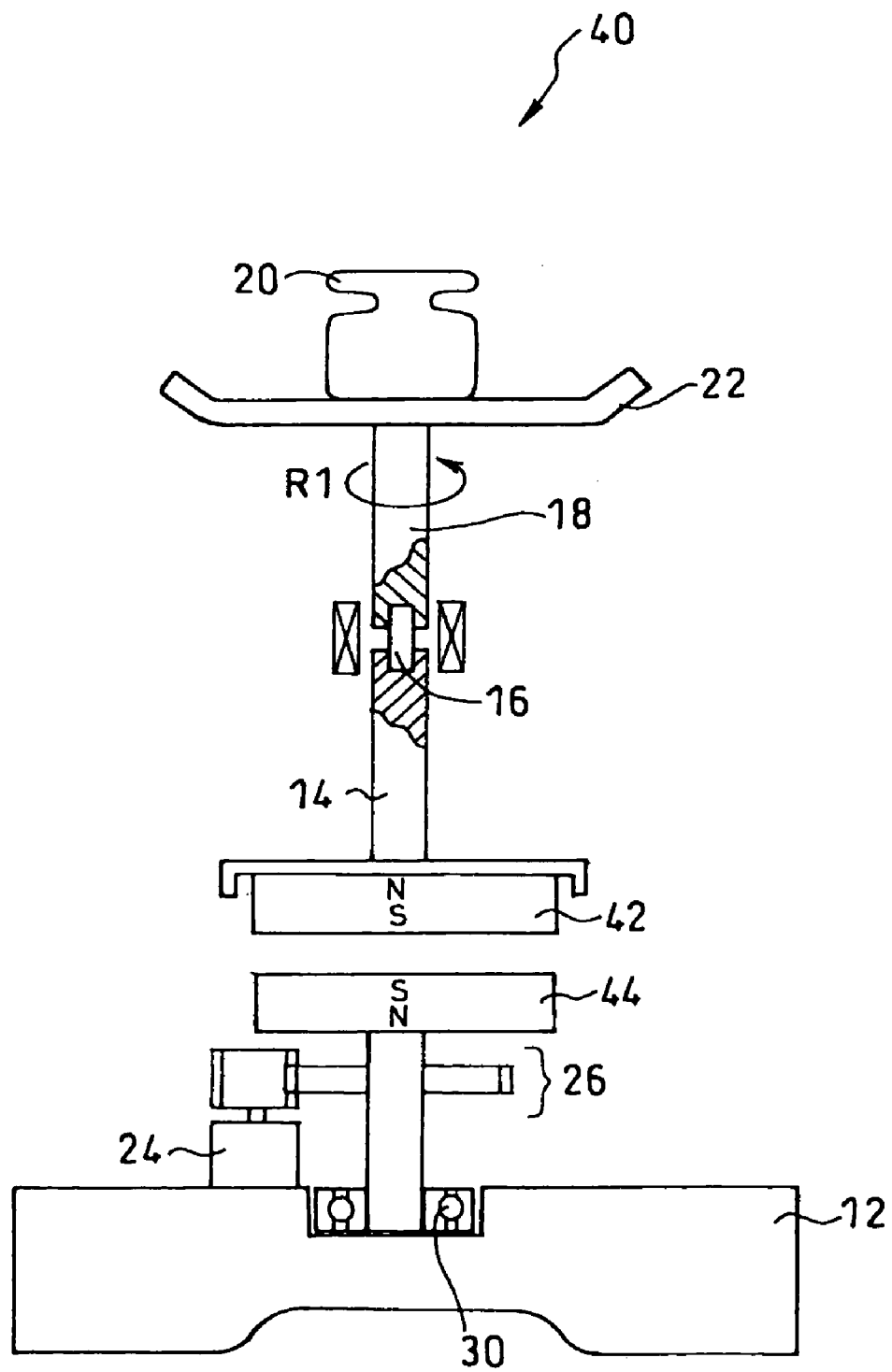
FIG. 4 is a schematic front view showing a weight sensor according to another exemplary embodiment of the present invention.
Figure 5:
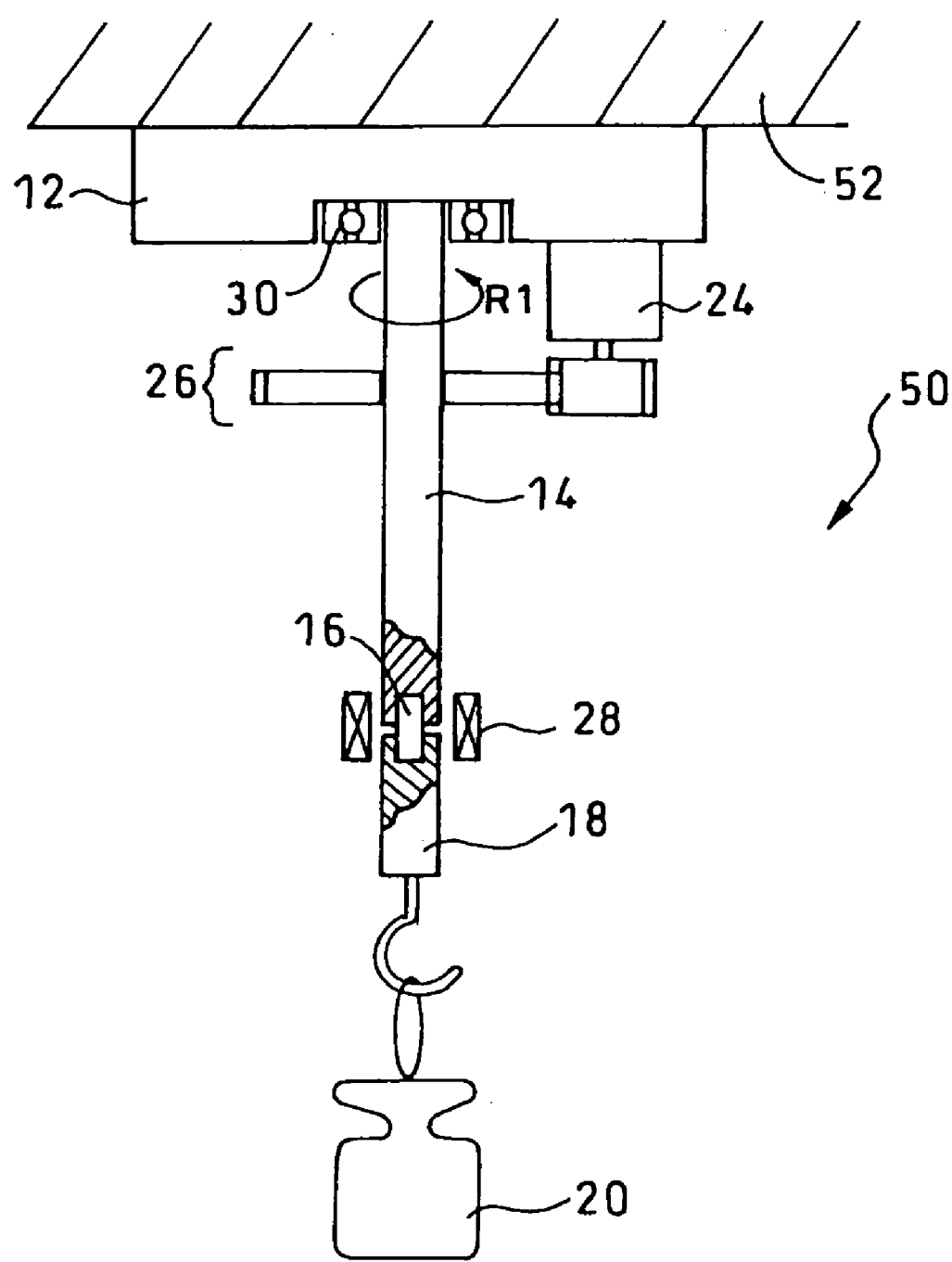
FIG. 5 is a schematic front view showing a weight sensor according to still another exemplary embodiment of the present invention.
Figure 6:
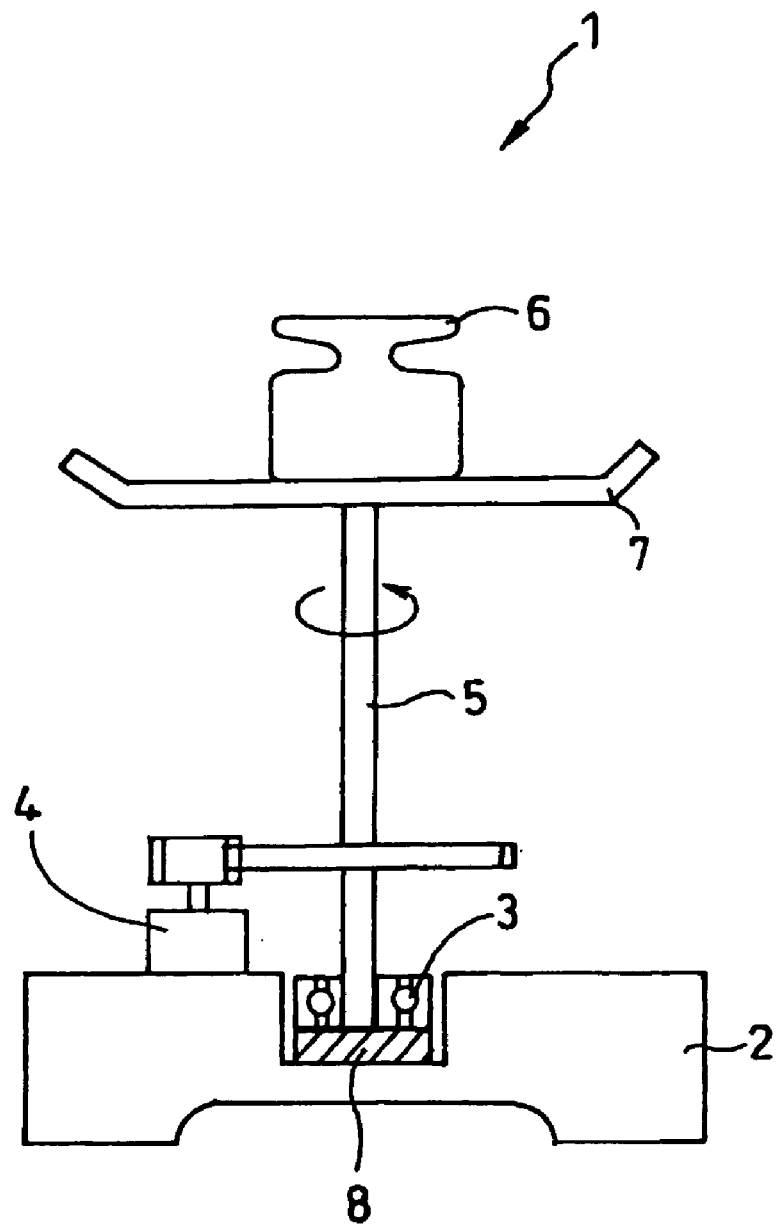
FIG. 6 is a schematic front view showing a conventional weight sensor.

Therefore, as with a weight sensor 40 shown in FIG. 4, the first rotating shaft 14 may be rotatably supported by a pair of radial magnets 42 and 44 arranged between the first rotating shaft 14 and the stage 12 such that their magnetic poles are opposite each other. In this case, because the object 20 is supported by the magnetic repulsive force of the pair of radial magnets 42 and 44, mechanical noises of a bearing or the like are eliminated, and load or pressure of the object is detected even more precisely. Alternatively, as with a weight sensor 50 shown in FIG. 5, the first rotating shaft 14 may be supported on the stage 12 secured to a base 52 in a suspended manner.

While the weight sensor 10 employs the giant magnetostrictive member 16 in the above-described exemplary embodiment, the present invention is not limited thereto, and a magnetostrictive member made of a magnetostrictive element may also be used.

INDUSTRIAL APPLICABILITY

The advantages of the weight sensor of the present invention are that it has a simple structure and yet is capable of detecting load or pressure of an object to be measured in a short time and with high sensitivity and high precision.

The invention claimed is:

1. A weight sensor characterized by comprising:
   a first rotating shaft vertically and rotatably supported on a stage;
   a second rotating shaft axially and coaxially connected to the first rotating shaft with a magnetostrictive member interposed therebetween for rotatably supporting an object to be measured;
   detecting means for detecting changes in magnetic permeability or remnant magnetization of the magnetostrictive member, wherein load or pressure of the object is detected as changes in magnetic permeability or remnant magnetization, which are caused by extension and contraction of the magnetostrictive member,
   wherein the detecting means includes a pickup coil disposed to surround the magnetostrictive member without contacting the first and second rotating shafts,
   the changes in magnetic permeability or remnant magnetization are detected as changes in inductance of the pickup coil, and
   the first rotating shaft is rotatably supported by a pair of radial magnets disposed between the first rotating shaft and the stage such that their magnetic poles are opposite each other.

2. The weight sensor according to claim 1, wherein the first rotating shaft and the second rotating shaft are spline-coupled to each other.

3. The weight sensor according to claim 1, wherein the magnetostrictive member is a giant magnetostrictive member made of a giant magnetostrictive element.

4. The weight sensor according to claim 2, wherein the magnetostrictive member is a giant magnetostrictive member made of a giant magnetostrictive element.

* * * * *